(12) United States Patent
Hiratsuka

(10) Patent No.: US 7,289,399 B2
(45) Date of Patent: Oct. 30, 2007

(54) TRACKING ERROR DETECTION APPARATUS INCLUDING REDUCTION IN FALSE TRACKING ERROR DETECTION DURING PHASE ERROR DETECTION

(75) Inventor: Takashige Hiratsuka, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 502 days.

(21) Appl. No.: 10/814,182

(22) Filed: Apr. 1, 2004

(65) Prior Publication Data

US 2004/0228233 A1    Nov. 18, 2004

(30) Foreign Application Priority Data

Apr. 2, 2003    (JP) .............................. 2003-099702

(51) Int. Cl.
G11B 7/00    (2006.01)
(52) U.S. Cl. ............................... 369/44.28; 369/44.29; 369/44.34; 369/44.41
(58) Field of Classification Search ............. 369/44.28, 369/44.41, 44.34; G11B 7/00
See application file for complete search history.

(56) References Cited

U.S. PATENT DOCUMENTS

| | | | | |
|---|---|---|---|---|
| 5,610,897 | A * | 3/1997 | Yamamoto et al. | 369/124.03 |
| 6,310,851 | B1 * | 10/2001 | Tobita et al. | 369/111 |
| 6,804,177 | B1 * | 10/2004 | Rieck et al. | 369/30.15 |
| 6,868,052 | B2 * | 3/2005 | Konno et al. | 369/53.23 |
| 6,963,521 | B2 * | 11/2005 | Hayashi | 369/44.13 |
| 7,012,862 | B2 * | 3/2006 | Hiratsuka | 369/44.34 |
| 7,113,460 | B2 * | 9/2006 | Nakajima et al. | 369/44.26 |
| 7,184,375 | B1 * | 2/2007 | Buchler et al. | 369/44.35 |

FOREIGN PATENT DOCUMENTS

| | | |
|---|---|---|
| JP | 59-152545 | 8/1984 |
| JP | 63-18529 | 1/1988 |
| JP | 63-20726 | 1/1988 |
| JP | 63-181126 | 7/1988 |
| JP | 1-155525 | 6/1989 |
| JP | 2-134732 | 5/1990 |
| JP | 10-124890 | 5/1998 |
| JP | 10-208262 | 8/1998 |
| JP | 11-243618 | 9/1999 |
| JP | 2001-67690 | 3/2001 |

* cited by examiner

*Primary Examiner*—A M Psitos
(74) *Attorney, Agent, or Firm*—Wenderoth, Lind & Ponack, L.L.P.

(57) ABSTRACT

A tracking error detection apparatus comprises a photodetector comprising plural photoreceptor elements; zerocross detection circuits for detecting zerocross points at which two sequences of digital signals intersect the center levels of the respective digital signals, which digital signals are generated according to the amounts of light received by the respective photoreceptor elements and are outputted from the photodetector; a phase difference detection circuit for performing phase comparison using a distance between zerocross points of the two sequences of digital signals, and outputting a result of phase comparison; and a low-pass filter for performing band restriction to a signal outputted from the phase difference detection circuit. When a phase difference between the two sequences of digital signals, which is detected by the phase difference detection circuit, is larger than a maximum value of a theoretical tracking error signal, the output from the phase difference detection circuit is limited.

4 Claims, 15 Drawing Sheets

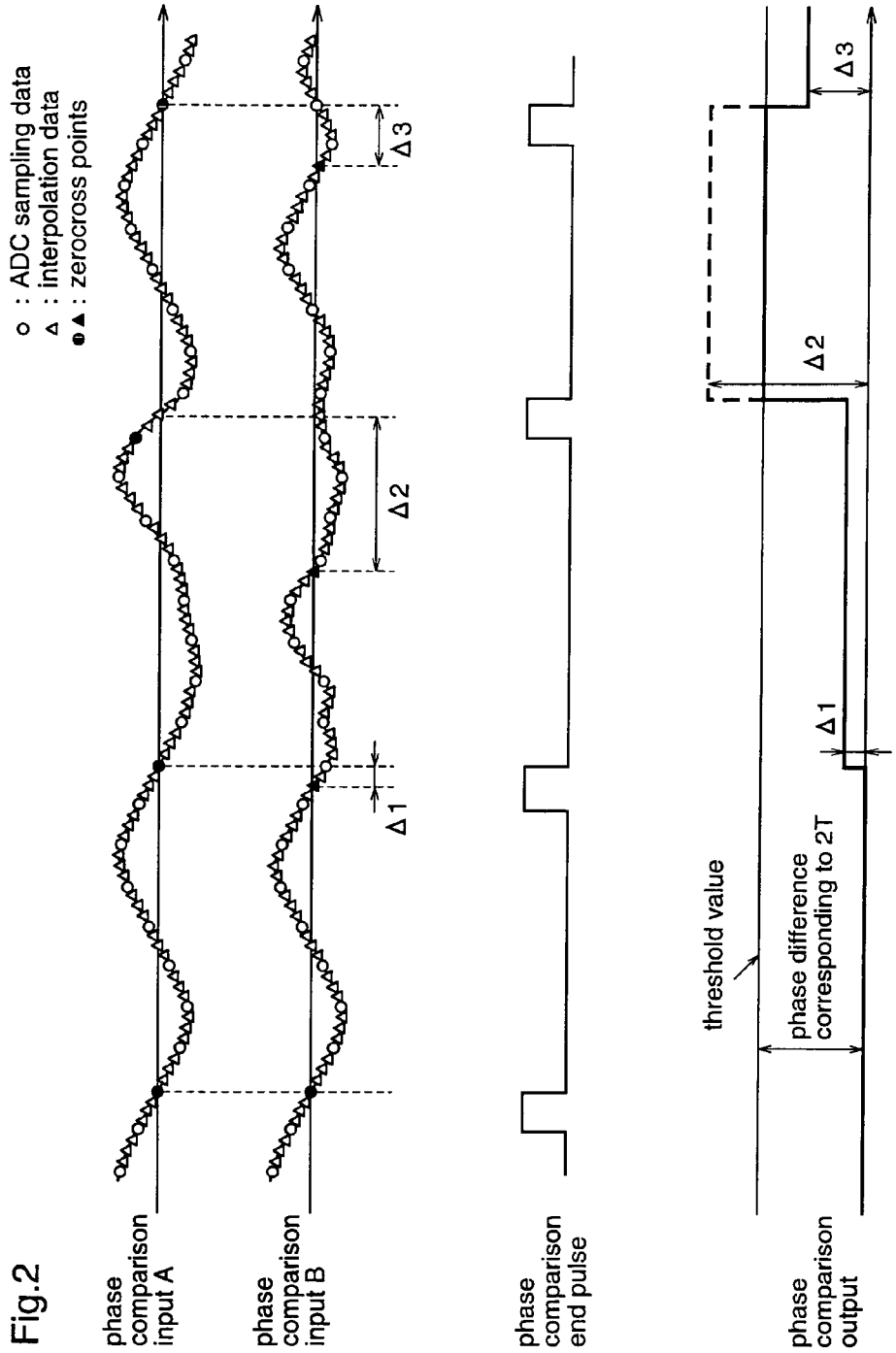

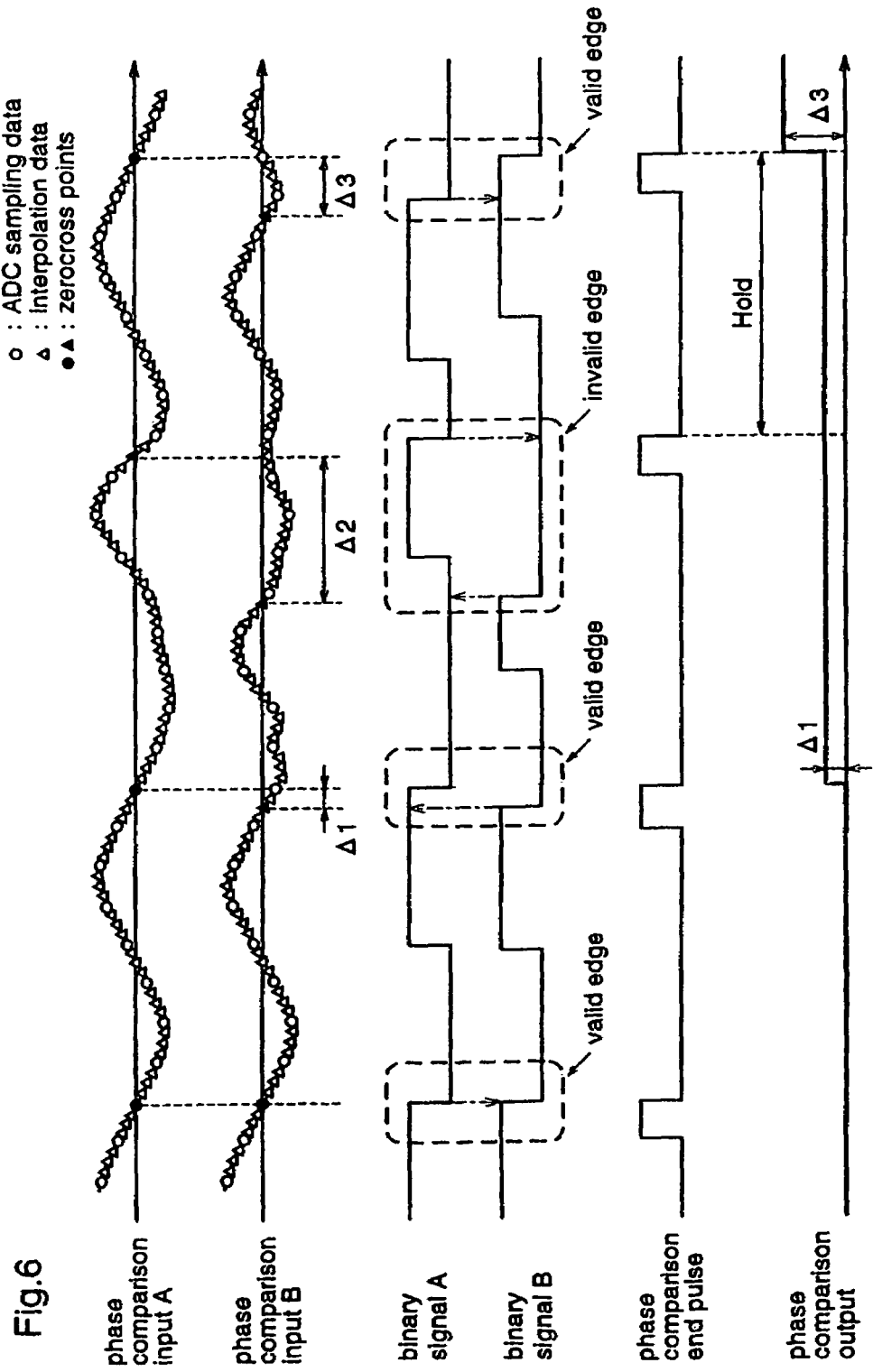

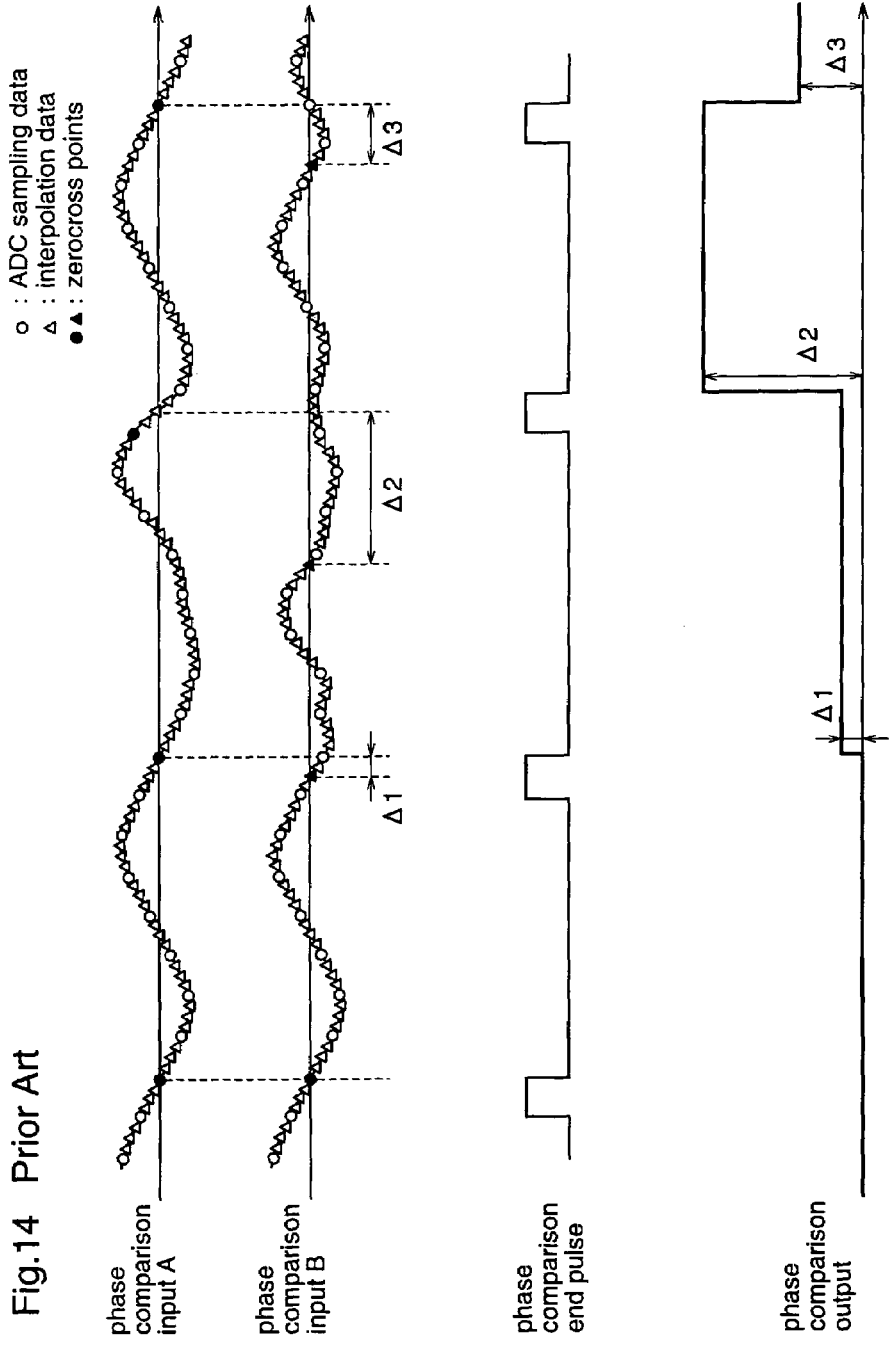

TRACKING ERROR DETECTION APPARATUS INCLUDING REDUCTION IN FALSE TRACKING ERROR DETECTION DURING PHASE ERROR DETECTION

FIELD OF THE INVENTION

The present invention relates to a tracking error detection apparatus for detecting a tracking error of a light spot that is obtained by irradiating an optical recording medium with a light beam.

BACKGROUND OF THE INVENTION

In recent years, a technique called "phase difference method" has been employed as a method for obtaining a tracking control signal from an optical disc on which information is recorded by projecting and depressing pits, such as a CD (Compact Disc) or a DVD (Digital Video Disc).

Japanese Published Patent Application No. Hei.2001-67690 discloses an example of such phase difference method.

Hereinafter, a conventional tracking error detection apparatus disclosed in Japanese Published Patent Application No. Hei.2001-67690 will be described with reference to FIG. 10.

FIG. 10 is a block diagram illustrating the construction of the conventional tracking error detection apparatus.

As shown in FIG. 10, the conventional tracking error detection apparatus is provided with a photodetector 101 having photoreceptor elements 101a, 101b, 101c, and 101d that receive a reflected light beam from a light spot, and outputting photo currents according to the amounts of light received by the respective photoreceptor elements; first to fourth current-to-voltage converter 102a to 102d for converting the photo currents outputted from the photodetector 101 into voltage signals; signal generators, i.e., first and second adders 103a and 103b, for generating two signal sequences whose phases change depending on a tracking error of the light spot, from the voltage signals obtained by the first to fourth current-to-voltage converter 102a to 102d; first and second analog-to-digital converters (ADC) 104a and 104b for obtaining first and second digital signal sequences from the two signal sequences; first and second interpolation filters 105a and 105b for subjecting the inputted digital signals to interpolation; first and second zero cross point detection circuits 106a and 106b for detecting zero cross points of the first and second digital signal sequences which are interpolated by the first and second interpolation filters 105a and 105b, respectively; a phase difference detection circuit 107 for detecting a phase difference between the zero cross point of the first digital signal sequence and the zero cross point of the second digital signal sequence; and a low-pass filter (LPF) 108 for subjecting a phase comparison signal outputted from the phase difference detection circuit 107 to band restriction to obtain a tracking error signal. The photodetector 101 comprises the four photodetector elements 101a, 101b, 101c, and 101d which are partitioned in a tangential direction and a perpendicular direction with respect to an information track that is recorded as an information pit line on the recording medium. Among the signals which are generated according to the amounts of light received by the respective photoreceptor elements and are outputted from the photodetector 101, the output signals from the photoreceptor elements positioned on a diagonal line are added by each of the first and second adders 103a and 103b, thereby generating two sequences of digital signals. Further, a zerocross point is a point where an inputted digital signal intersects a center level of the digital signal that is calculated from an average value or the like of the digital signal.

Next, the operation of the conventional tracking error detection apparatus will be described.

Initially, in the photodetector 101, the respective photoreceptor elements 101a, 101b, 101c, and 101d receive a reflected light beam from a light spot that is obtained by irradiating a track on an optical recording medium (not shown) with a light beam, and output photo currents according to the amounts of received light.

The photo currents outputted from the respective photoreceptor elements of the photodetector 101 are converted into voltage signals by the first to fourth current-to-voltage conversion circuits 102a, 102b, 102c, and 102d, and the first adder 103a adds the outputs of the first and third current-to-voltage circuits 102a and 102c while the second adder 103b adds the outputs of the second and fourth current-to-voltage circuits 102b and 102d.

Then, the signals outputted from the first and second adders 103a and 103b are subjected to sampling using a sampling clock by the first and second ADCs 104a and 104b to be converted into first and second digital signal sequences, respectively.

Then, the digital signals outputted from the first and second ADCs 104a and 104b are input to the interpolation filters 105a and 105b to obtain interpolation data between the sampling data of the digital signals. Thereafter, zerocross points at the rising edges or falling edges of the two interpolated data sequences are detected by the zerocross point detection circuits 106a and 106b, respectively. For example, as a method of interpolation, "Nyquist interpolation" may be employed. As a method of detecting zerocross points at the rising or falling edges of two data sequences, change points of signs (+→− or −→+) in the interpolated data sequences may be obtained.

In the phase error detection circuit 107, a distance between the zerocross points in the waveforms of the first and second signal sequences is obtained using information of the zerocross points outputted from the zerocross point detection circuits 106a and 106b, and a phase comparison signal is detected on the basis of the distance between the zerocross points, and finally, band restriction is carried out by the LPF 108 to generate a tracking error signal of a frequency band that is required for tracking servo control.

Next, the construction and operation of the conventional phase difference detection circuit 107 will be described in more detail with reference to FIGS. 11 and 12.

FIG. 11 is a block diagram illustrating the construction of the conventional phase error detection circuit 107.

In FIG. 11, the phase difference detection circuit 107 comprises a phase difference calculation unit 1, a pulse generation unit 2, and a data updation unit 3.

The phase difference calculation unit 1 calculates a distance between the zerocross points of the two sequences of digital signals on the basis of the zerocross information detected by the zerocross point detection circuits 106a and 106b, and successively outputs it as a result of phase comparison to the data updation unit 3.

The pulse generation unit 2 generates pulse signals each corresponding to one sampling clock at the zerocross positions in the respective data sequences to be used for phase comparison, and outputs a pulse signal that appears later at a point where phase comparison is to be carried out, as a phase comparison end pulse, between the generated pulse signals corresponding to the respective data sequences.

The data updation unit 3 updates the output data for every phase comparison end pulse outputted from the pulse generation unit 2, using the phase comparison results that are successively outputted from the phase difference calculation unit 1, and maintains the output level of the output data until the next phase comparison end pulse arrives.

FIG. 12 is a diagram for explaining the operation of the phase difference detection circuit 107. FIG. 12 shows, from top to bottom, a first signal sequence outputted from the first zerocross point detection circuit 106a (phase comparison input A), a second signal sequence outputted from the second zerocross point detection circuit 106b (phase comparison input B), a phase comparison end pulse outputted from the pulse generation unit 2, and a phase comparison output from the phase difference detection circuit 107.

With reference to the phase comparison inputs A and B shown in FIG. 21, ○ indicates sampling data obtained by the first or second ADC 104a or 104b, Δ indicates interpolation data sequences obtained by the first or second interpolation filters 105a or 105b, and ● and ▲ indicate zerocross points obtained from the sampling data sequences and the interpolation data sequences. Further, the phase comparison signal shown in FIG. 12 is obtained with respect to a vicinity of a specific track, and it is obtained at the falling edges of the two data sequences a phase difference of which should be obtained. Further, the number of interpolation data is 3 (n=3).

When the outputs from the zerocross point detection circuits 106a and 106b are input to the phase difference detection circuit 107, the phase difference calculation unit 1 calculates a distance between the zerocross points detected by the zerocross point detection circuits 106a and 106b. Then, the pulse generation unit 2 generates a pulse signal corresponding to one sampling clock at a position where each of the data sequences (phase comparison inputs A and B) to be used for phase comparison performs zerocross, and outputs a pulse signal that appears later at a point where phase comparison is carried out, between the generated pulse signals corresponding to the respective data sequences, as a phase comparison end pulse (refer to the phase comparison end pulse shown in FIG. 12).

Then, the data updation unit 3 performs updation of the output data using the phase comparison result outputted from the phase difference calculation unit 1, for every phase comparison end pulse outputted from the pulse generator 2, and maintains the output level of the output data until the next phase comparison end pulse arrives (refer to the phase comparison output shown in FIG. 12).

Thereby, the phase difference detection circuit 107 detects a phase comparison signal as shown by the phase comparison output in FIG. 12, and the tracking error signal obtained by performing band restriction to the phase comparison signal becomes an approximately straight signal when paying attention to a vicinity of a specific track. Then, the tracking error signal is observed over plural tracks, thereby obtaining, as a whole, an approximately sinusoidal waveform that is repeated for every track as shown in FIG. 13.

As described above, since the conventional tracking error detection apparatus can detect a tracking error by digital signal processing, it can deal with speedup of an optical recording/playback apparatus and an increase in recording density on a recording medium, which cannot be achieved by tracking error detection using analog signal processing. Furthermore, the constituents relating to analog signal processing can be significantly reduced, thereby realizing small-sized and low-cost optical recording/playback apparatus.

In the above-mentioned conventional tracking error detection apparatus, however, when the amplitude of the analog signal inputted to the first and second ADCs 104a and 104b cannot be sufficiently obtained due to a defect or the like, or when the analog signal has a noise, the first and second zerocross point detection circuits 106a and 106b incorrectly detect zerocross points, resulting in false detection of the phase difference detection circuit 107.

FIG. 14 is a diagram illustrating a tracking error signal that is detected by the conventional tracking error detection apparatus when the amplitude of the analog signal inputted to the first and second ADCs 104a and 104b is not sufficiently obtained.

FIG. 14 shows, from top to bottom, a first signal sequence outputted from the first zerocross point detection circuit 106a (phase comparison input A), a second signal sequence outputted from the second zerocross point detection circuit 106b (phase comparison input B), a phase comparison end pulse outputted from the pulse generation unit 2, and a phase comparison output from the phase difference detection circuit 107.

As shown by the phase comparison input B, when the amplitude of the analog signal inputted to the first and second ADCs 104a and 104b is not sufficiently obtained due to a defect or the like, zerocross points are not accurately detected by the zerocross point detection circuit 106, and an error phase difference as indicated by Δ2 in FIG. 14 may be detected as a phase comparison result.

The phase comparison output which is generated by the data updation unit 3 of the phase difference detection circuit 107 using such phase comparison result undesirably becomes a phase difference signal having a large value as shown in FIG. 14, resulting in degradation in accuracy of the tracking error signal that is generated by performing band restriction with the LPF 108.

SUMMARY OF THE INVENTION

The present invention is made to solve the above-described problems and has for its object to provide a tracking error detection apparatus that can reduce influences of false detection during phase error detection to improve accuracy of a tracking error signal.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which two sequences of digital signals intersect center levels of the respective digital signals, each of the two sequences of digital signals being obtained by adding output signals from the two photoreceptor elements positioned on a diagonal line, among four signals that are generated according to the amounts of light received by the respective photoreceptor elements and are outputted from the photodetector; a phase difference detection circuit for performing phase comparison using a distance between the zerocross points of the two sequences of digital signals, and limiting the result of phase comparison to a value under a first predetermined value when the result of phase comparison is larger than the first predetermined value; and a low-pass filter for performing band restriction to a signal outputted from the phase difference detection circuit, thereby to obtain a tracking error signal. Therefore, it is possible to reduce influences of false detection during phase error detection, thereby enhancing accuracy of the tracking error signal.

According to a second aspect of the present invention, in the tracking error detection apparatus according to the first aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, respectively, and outputting, as a phase comparison end pulse, a pulse signal that appears later at a point where phase comparison is carried out, between the generated pulse signals corresponding to the two sequences of digital signals; a data updation unit for updating the output data using the result of phase comparison that is successively outputted from the phase difference calculation unit, at every phase comparison end pulse outputted from the pulse generation unit, and maintaining the output level of the output data until the next phase comparison end pulse arrives; and a limit control unit for judging whether the output signal from the data updation unit is larger than the first predetermined value or not, and limiting the output signal to a value under the first predetermined value when the output signal is larger than the first predetermined value.

According to a third aspect of the present invention, in the tracking error detection apparatus according to the second aspect, the first predetermined value of the limit control unit is set on the basis of the relationship between a shortest pit length and a track pitch of an optical disc to be played.

According to a fourth aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which two sequences of digital signals intersect center levels of the respective digital signals, each of the two sequences of digital signals being obtained by adding output signals from the two photoreceptor elements positioned on a diagonal line, among four signals that are generated according to the amounts of light received by the respective photoreceptor elements and are outputted from the photodetector; an edge detection circuit for detecting the states of edges to be used for phase comparison, using binary signals of sampling data of the two sequences of digital signals; a phase difference detection circuit for performing phase comparison using a distance between the zerocross points of the two sequences of digital signals; and a low-pass filter for performing band restriction to the signal outputted from the phase difference detection circuit, thereby to obtain a tracking error signal; wherein the phase difference detection circuit judges whether the edges to be the targets of phase comparison are valid as edges for phase comparison or not on the basis of the states of the edges detected by the edge detection circuit, and does not carry out output/updation of the phase comparison result at the edges judged as "invalid". Therefore, it is possible to reduce influences of false detection during phase error detection, thereby enhancing accuracy of the tracking error signal.

According to a fifth aspect of the present invention, in the tracking error detection apparatus according to the fourth aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, respectively, and outputting, as a phase comparison end pulse, a pulse signal that appears later at a point where phase comparison is carried out, between the generated pulse signals corresponding to the two sequences of digital signals; an invalid edge cancel unit for judging whether the edges to be the targets of phase comparison are valid as edges for phase comparison or not, on the basis of the states of the edges detected by the edge detection circuit; and a data updation unit operating at every phase comparison end pulse outputted from the pulse generation unit, the data updation unit updating the output data using the result of phase comparison that is outputted from the phase difference calculation unit, and maintaining the output level of the output data until the next phase comparison end pulse arrives, when the result of judgement by the invalid edge cancel unit is "valid", while maintaining the output level of the data that has been outputted at the just-previous phase comparison end pulse, when the result of judgement in the invalid edge cancel unit is "invalid".

According to a sixth aspect of the present invention, in the tracking error detection apparatus according to the fifth aspect, the edge detection circuit detects, from an edge falling position of a signal including a preceding edge, the state of another signal at each point where a phase difference is to be detected, and outputs a signal indicating that the edges of these signals are aligned with each other or that the level of the other signal is "1" or "0"; and the invalid edge cancel unit judges the edges as valid edges when the edges are aligned with each other or when the level of the other signal is "1", and judges the edges as invalid edges when the level of the other signal is "0", on the basis of the output from the edge detection circuit.

According to a seventh aspect of the present invention, in the tracking error detection apparatus according to the fifth aspect, the edge detection circuit detects rising edges or falling edges of binary signals of sampling data of the two sequences of digital signals, and outputs a signal indicating whether or not a distance between the detected rising or falling edges is equal to or smaller than a second predetermined value; and the invalid edge cancel unit judges the edges as valid edges when the distance between the rising or falling edges is equal to or smaller than the second predetermined value, and judges the edges as invalid edges when the distance is larger than the second predetermined value, on the basis of the output from the edge detection circuit.

According to an eighth aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which four sequences of digital signals intersect center levels of the respective digital signals, the four sequences of digital signals being generated according to the amounts of light received by the respective photoreceptor elements and are outputted from the photodetector; a first phase difference detection circuit for performing phase comparison using a distance between the zerocross points of two sequences of digital signals that are obtained from the photoreceptor elements positioned forward in the advancing direction of the information track, among the zerocross points of the four sequences of digital signals, and limiting the result of phase comparison to a value under the first predetermined value when the result of phase comparison is larger than the first predetermined value; and a second phase difference detection circuit for performing phase comparison using a distance between the zerocross points of two sequences of digital signals that are obtained from the photoreceptor elements positioned backward in the advancing direction of the information track, among the zerocross points of the four sequences of digital signals, and limiting the result of phase comparison to a value under the first predetermined value when the result of phase comparison is larger than the first predetermined value; an addition circuit for adding the output signals of the first and second phase difference detection circuits; and a low-pass filter for performing band restriction to the signal outputted from the addition circuit, thereby to obtain a tracking error signal. Therefore, it is possible to reduce influences of false detection during phase error detection, thereby enhancing accuracy of the tracking error signal. Further, no offset that depends on the depth of the pit carved in the disc occurs, thereby producing an accurate tracking error signal.

According to a ninth aspect of the present invention, in the tracking error detection apparatus according to the eighth aspect, each of the first and second phase difference circuits comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, respectively, and outputting, as a phase comparison end pulse, a pulse signal that appears later at a point where phase comparison is carried out, between the generated pulse signals corresponding to the two sequences of digital signals; a data updation unit for updating the output data using the result of phase comparison that is successively outputted from the phase difference calculation unit, at every phase comparison end pulse outputted from the pulse generation unit, and maintaining the output level of the output data until the next phase comparison end pulse arrives; and a limit control unit for judging whether the output signal from the data updation unit is larger than the first predetermined value or not, and limiting the output signal to a value under the first predetermined value when the output signal is larger than the first predetermined value.

According to a tenth aspect of the present invention, in the tracking error detection apparatus according to the ninth aspect, the first predetermined value of the limit control unit is set on the basis of the relationship between a shortest pit length and a track pitch of an optical disc to be played.

According to an eleventh aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which four sequences of digital signals intersect center levels of the respective digital signals, the four sequences of digital signals being generated according to the amounts of light received by the respective photoreceptor elements and are outputted from the photodetector; a first edge detection circuit for detecting the states of edges to be used for phase comparison, using binary signals of sampling data of two sequences of digital signals that are obtained from the photoreceptor elements positioned forward in the advancing direction of the information track, among the four sequences of digital signals; a second edge detection circuit for detecting the states of edges to be used for phase comparison, using binary signals of sampling data of two sequences of digital signals that are obtained from the photoreceptor elements positioned backward in the advancing direction of the information track, among the four sequences of digital signals; a first phase difference detection circuit for performing phase comparison using a distance between the zerocross points of the two sequences of digital signals that are obtained from the photoreceptor elements positioned forward in the advancing direction of the information track, among the zerocross points of the four sequences of digital signals, and outputting the result of phase comparison; a second phase difference detection circuit for performing phase comparison using a distance between the zerocross points of the two sequences of digital signals that are obtained from the photoreceptor elements positioned backward in the advancing direction of the information track, among the zerocross points of the four sequences of digital signals, and outputting the result of phase comparison; an addition circuit for adding the output signals of the first and second phase difference detection circuits; and a low-pass filter for performing band restriction to the signal outputted from the addition circuit, thereby to obtain a tracking error signal; wherein the first phase difference detection circuit judges whether the edges to be the targets of phase comparison are valid as edges for phase comparison or not, on the basis of the states of edges detected by the first edge detection circuit, and does not perform output and updation of the result of phase comparison at the edges that are judged as invalid by the judgement; and the second phase difference detection circuit judges whether the edges to be the targets of phase comparison are valid as edges for phase comparison or not, on the basis of the states of edges detected by the second edge detection circuit, and does not perform output and updation of the result of phase comparison at the edges that are judged as invalid by the judgement. Therefore, it is possible to reduce influences of false detection during phase error detection, thereby enhancing accuracy of the tracking error signal. Further, no offset that depends on the depth of the pit carved in the disc occurs, thereby producing an accurate tracking error signal.

According to a twelfth aspect of the present invention, in the tracking error detection apparatus according to the eleventh aspect, each of the first and second phase difference detection circuits comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, respectively, and outputting, as a phase comparison end pulse, a pulse signal that appears later at a point where phase comparison is carried out, between the generated pulse signals corresponding to the two sequences of digital signals; an invalid edge cancel unit for judging whether the edges to be the targets of phase comparison are valid as edges for phase comparison or not, on the basis of the states of edges detected by the first or second edge detection circuit; and a data updation unit operating at every phase comparison end pulse outputted from the pulse generation unit, the data updation unit updating the output data using the result of phase comparison outputted from the phase difference calculation unit, and maintaining the output level of the output data until the next phase comparison end pulse arrives, when the result of judgement by the invalid edge cancel unit is "valid", while maintaining the output level of the data outputted at the just-previous phase comparison end pulse, when the result of judgement by the invalid edge cancel unit is "invalid".

According to a thirteenth aspect of the present invention, in the tracking error detection apparatus according to the twelfth aspect, each of the first and second edge detection circuits detects, from an edge falling position of a signal including a preceding edge, the state of another signal at each point where a phase difference is to be detected, and outputs a signal indicating that the edges of these signals are aligned with each other or that the level of the other signal is "1" or "0"; and the invalid edge cancel unit judges the edges as valid edges when the edges are aligned with each other or when the level of the other signal is "1", and judges the edges as invalid edges when the level of the other signal is "0", on the basis of the output from the edge detection circuit.

According to a fourteenth aspect of the present invention, in the tracking error detection apparatus according to the twelfth aspect, each of the first and second edge detection circuits detects rising edges or falling edges of binary signals of sampling data of the two sequences of digital signals, and outputs a signal indicating whether or not a distance between the detected rising or falling edges is equal to or smaller than a second predetermined value; and the invalid edge cancel unit judges the edges as valid edges when the distance between the rising or falling edges is equal to or smaller than the second predetermined value, and judges the edges as invalid edges when the distance is larger than the second predetermined value, on the basis of the output from the edge detection circuit.

BRIEF DESCRIPTION OF THE DRAWINGS

FIG. 2 is a diagram for explaining the operation of a phase difference detection circuit according to the first embodiment.

FIG. 6 is a diagram for explaining the operation of an invalid pulse cancel unit according to the second embodiment.

FIG. 14 is a diagram illustrating a tracking error signal that is detected by the conventional tracking error detection apparatus when an amplitude of an analog signal to be input to first and second ADCs is not sufficiently obtained.

DETAILED DESCRIPTION OF THE PREFERRED EMBODIMENTS

Embodiment 1

Hereinafter, a tracking error detection apparatus according to a first embodiment of the present invention will be described with reference to FIGS. 1 and 2.

Figure 1:
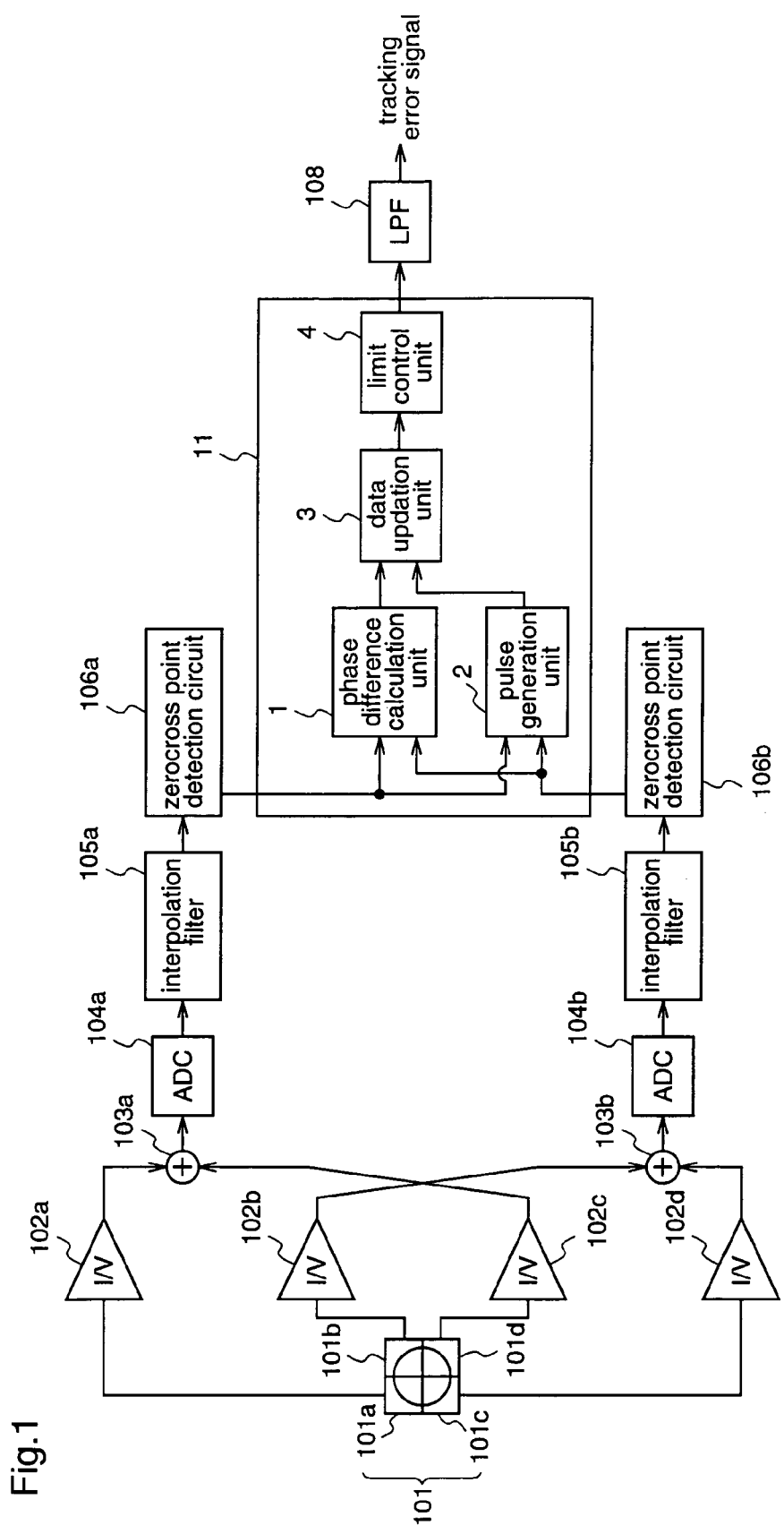
FIG. 1 is a block diagram illustrating a tracking error detection apparatus according to a first embodiment of the present invention.

FIG. 1 is a block diagram illustrating an example of a tracking error detection apparatus according to the first embodiment.

Figure 10:
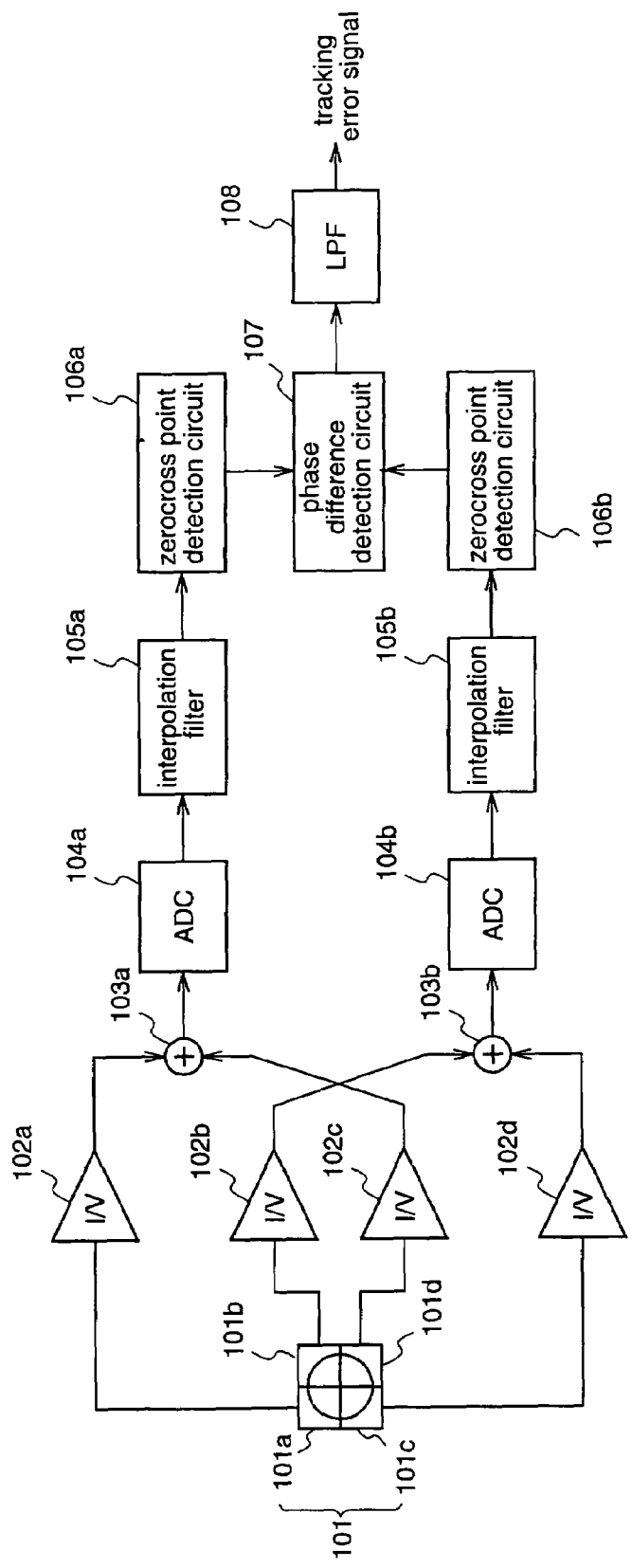
FIG. 10 is a block diagram illustrating a conventional tracking error detection apparatus.
Figure 11:
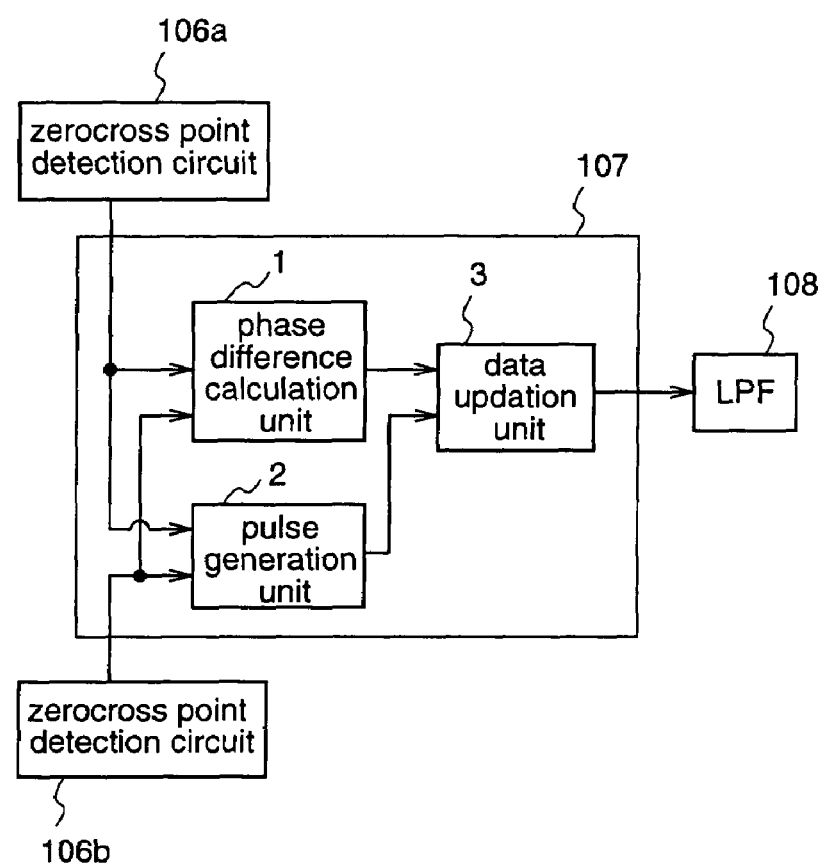
FIG. 11 is a block diagram illustrating a conventional phase difference detection circuit.
Figure 12:
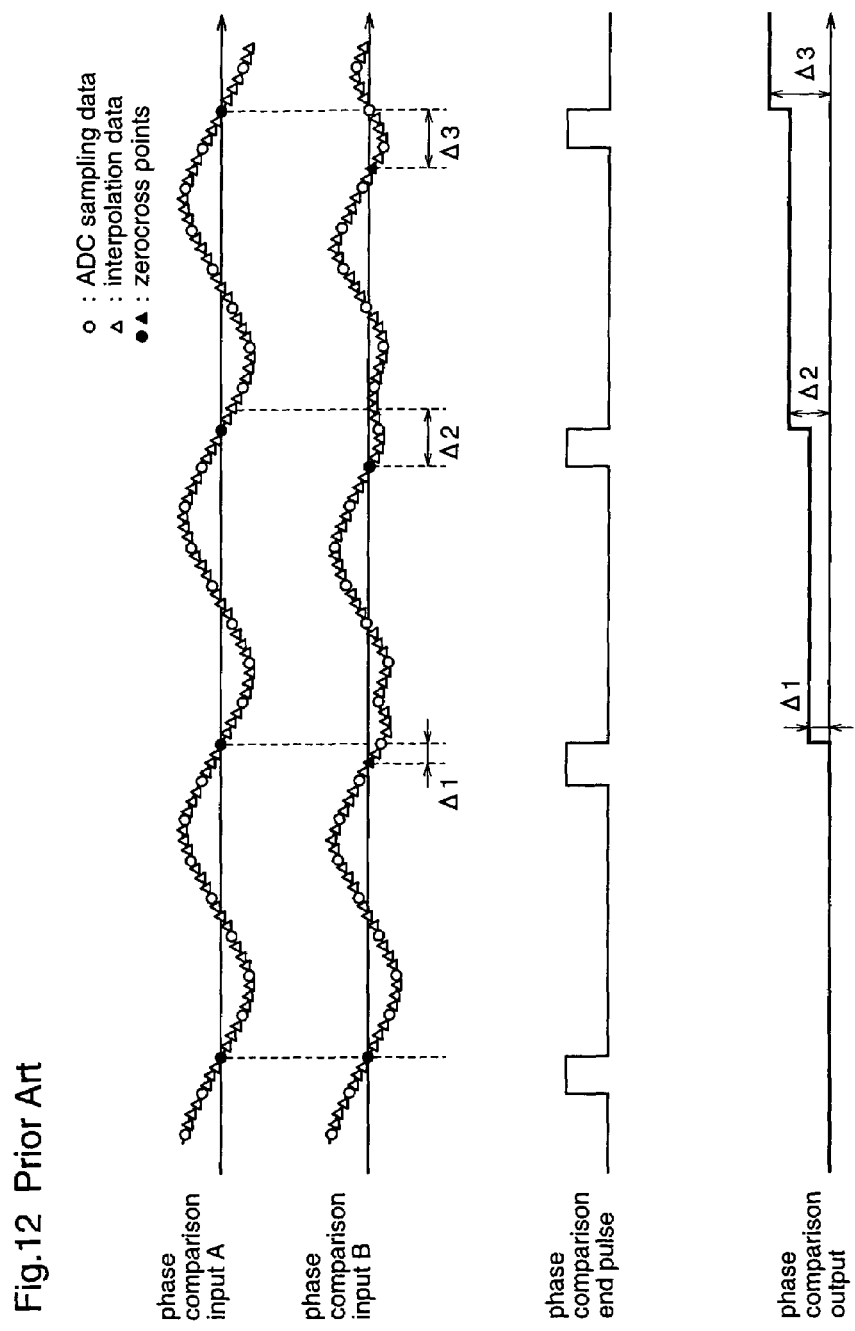
FIG. 12 is a diagram for explaining the operation of the conventional phase difference detection circuit.
Figure 13:
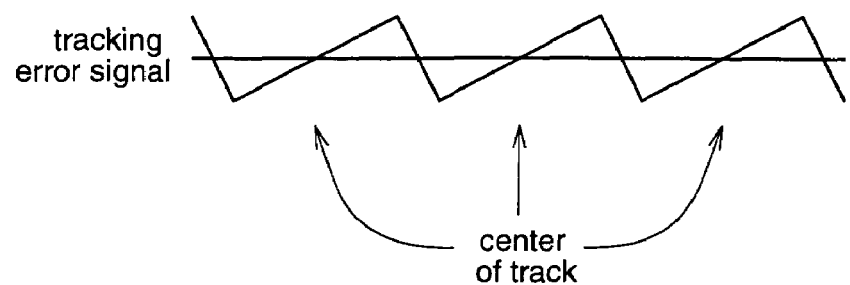
FIG. 13 is a diagram illustrating a tracking error signal detected by the tracking error detection apparatus.

In FIG. 1, the tracking error detection apparatus according to the first embodiment comprises a photodetector 101, current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 11, and a low-pass filter (LPF) 108. Since the constituents of the tracking error detection apparatus according to the first embodiment other than the phase difference detection circuit 11 are identical to those of the conventional tracking error difference detection apparatus described with reference to FIG. 10, repeated description is not necessary.

The phase difference detection circuit 11 comprises a phase difference calculation unit 1, a pulse generation unit 2, a data updation unit 3, and a limit control unit 4. The phase difference calculation unit 1, the pulse generation unit 2, and the data updation unit 3 constituting the phase difference detection circuit 11 are identical to those of the conventional phase difference detection circuit 107 described with reference to FIG. 10, repeated description is not necessary.

The limit control unit 4 judges whether the output signal from the data updation unit 3 is a value larger than the first predetermined value or not, and limits the output signal to a value under the first predetermined value when it is larger than the first predetermined value. The first predetermined value of the limit control unit 4 is arbitrarily set on the basis of the relationship between the shortest pit length and the track pitch on the optical disc to be played. It is desirable that the first predetermined value should be set at a value that does not exceed the maximum value of the tracking error signal of the optical disc to be played.

Next, the operation of the phase difference detection circuit 11 will be described.

FIG. 2 is a diagram for explaining the operation of the phase difference detection circuit 11. FIG. 2 shows, from top to bottom, a first signal sequence outputted from the first zerocross point detection circuit 106a (phase comparison input A), a second signal sequence outputted from the second zerocross point detection circuit 106b (phase comparison input B), a phase comparison end pulse outputted from the pulse generation unit 2, and a phase comparison outputted from the phase difference detection circuit 11.

The two sequences of signals (phase comparison inputs A and B shown in FIG. 2) outputted from the first and second zerocross point detection circuits 106a and 106b are input to the phase difference calculation unit 1 and to the pulse generation unit 2. In the phase difference calculation unit 1, phase differences Δ1, Δ2, and Δ3 are successively calculated on the basis of the zerocross information detected by the zerocross point detection circuits 106a and 106b. On the other hand, in the pulse generation unit 2, pulse signals each corresponding to one sampling clock are generated at positions where zerocross occurs in the respective data sequences to be used for phase comparison, and a pulse signal that appears later at a point where phase comparison is carried out, between the generated pulse signals corresponding to the respective data sequences, is output as a phase comparison end pulse (refer to the phase comparison end pulse shown in FIG. 2).

Thereafter, in the data updation unit 3, updation of the output signal using the phase comparison result outputted from the phase difference calculation unit 1 is carried out for every phase comparison end pulse outputted from the pulse generation unit 2, and the output level of the output data is maintained until the next phase comparison end pulse arrives (refer to the phase comparison output shown in FIG. 2).

Finally, the signal outputted from the data updation unit 3 is input to the limit control unit 4, wherein it is judged whether the signal outputted from the data updation unit 3 is larger than the first predetermined value possessed by the limit control unit 4 or not. When the output signal is larger than the first predetermined value, it is limited to a value under the first predetermined value, and outputted (refer to the phase comparison output shown in FIG. 2).

The phase comparison output thus generated is finally subjected to band restriction by the LPF 108, thereby generating a tracking error signal of a band required for tracking servo control.

Next, the first predetermined value to be used when the limit control unit 4 limits the output signal will be described taking, for example, a case where the optical disc is a DVD-ROM.

Figure 3A:
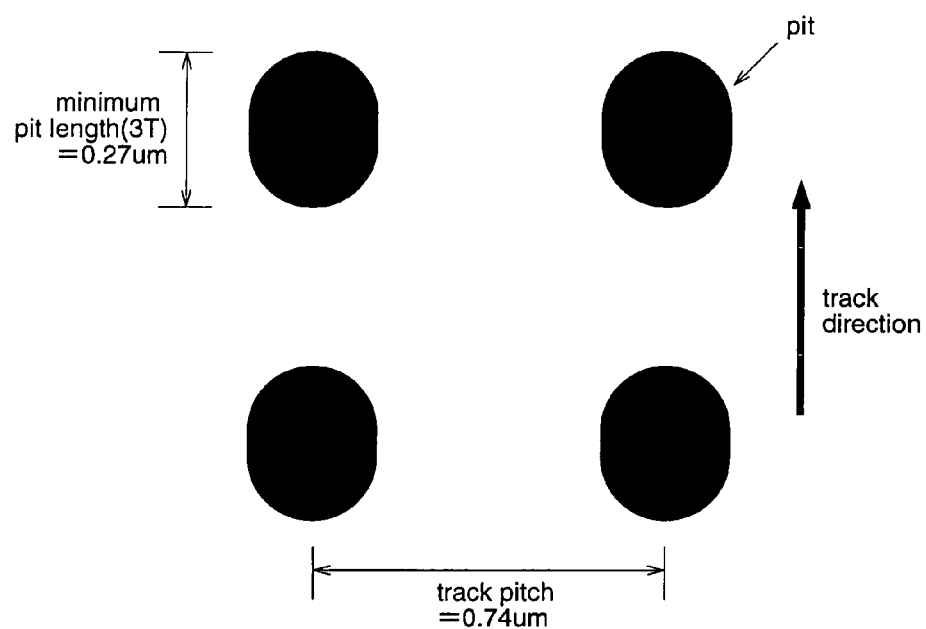
FIGS. 3(a) and 3(b) are diagrams illustrating the relationship between pits and a tracking error signal in a DVD-ROM.
Figure 3B:
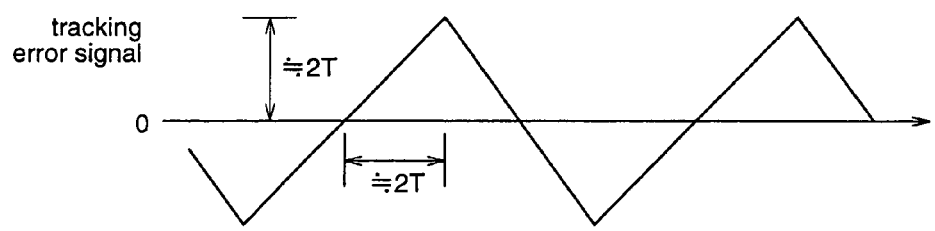

FIGS. 3(a) and 3(b) show the relationship between pits and a tracing error signal in a DVD-ROM. To be specific, FIG. 3(a) shows pits and tracks on the DVD-ROM, and FIG. 3(b) shows a tracking error signal obtained from the pits on the DVD-ROM shown in FIG. 3(a).

Assuming that one clock of channel clocks to be used in a recording/playback system when employing a 8-16 modulation code that is generally employed as a recording code for a DVD is 1T, the pits formed on the DVD-ROM disc have patterns of 3T~14T. In this case, the shortest pit length (3T) is 0.27 um, and the tracking pitch is 0.74 um. As shown in FIG. 3(b), the tracking error signal obtained from the pits on the DVD-ROM shown in FIG. 3(a) becomes "0" at the center of each track, and it is also "0" at a midpoint between adjacent tracks. Further, the tracking error signal becomes maximum at a point 0.74 um/4 (≈0.19 um) apart from the center of the track when calculated from the track pitch, and this corresponds to a distance of approximately 2T.

On the other hand, in the tracking error detection apparatus according to the first embodiment, since the phase difference is directly calculated as a distance between zerocross points, a value obtained as a result of phase comparison should be a value that does not exceed the maximum value of the tracking error signal.

Therefore, when an error signal larger than the maximum value 2T of the tracking error signal of the DVD-ROM is detected during DVD-ROM playback, this error signal is regarded as being incorrectly detected.

So, when performing DVD-ROM playback, the first predetermined value to be used when the limit control unit 4 limits the output signal is set to, for example, 2T, and when the output signal from the data updation unit 3 is larger than the value 2T, the output signal is limited by the value of 2T at which the tracking error signal becomes maximum, thereby reducing influences of false detection.

As described above, in the tracking error detection apparatus according to the first embodiment, the limit control unit 4 included in the phase difference detection circuit 11 puts a limitation on the signal amplitude during phase error signal detection, whereby influences of false detection during phase error detection can be reduced, resulting in improved accuracy of the tracking error signal.

Embodiment 2

Hereinafter, a tracking error detection apparatus according to a second embodiment of the present invention will be described.

Figure 4:
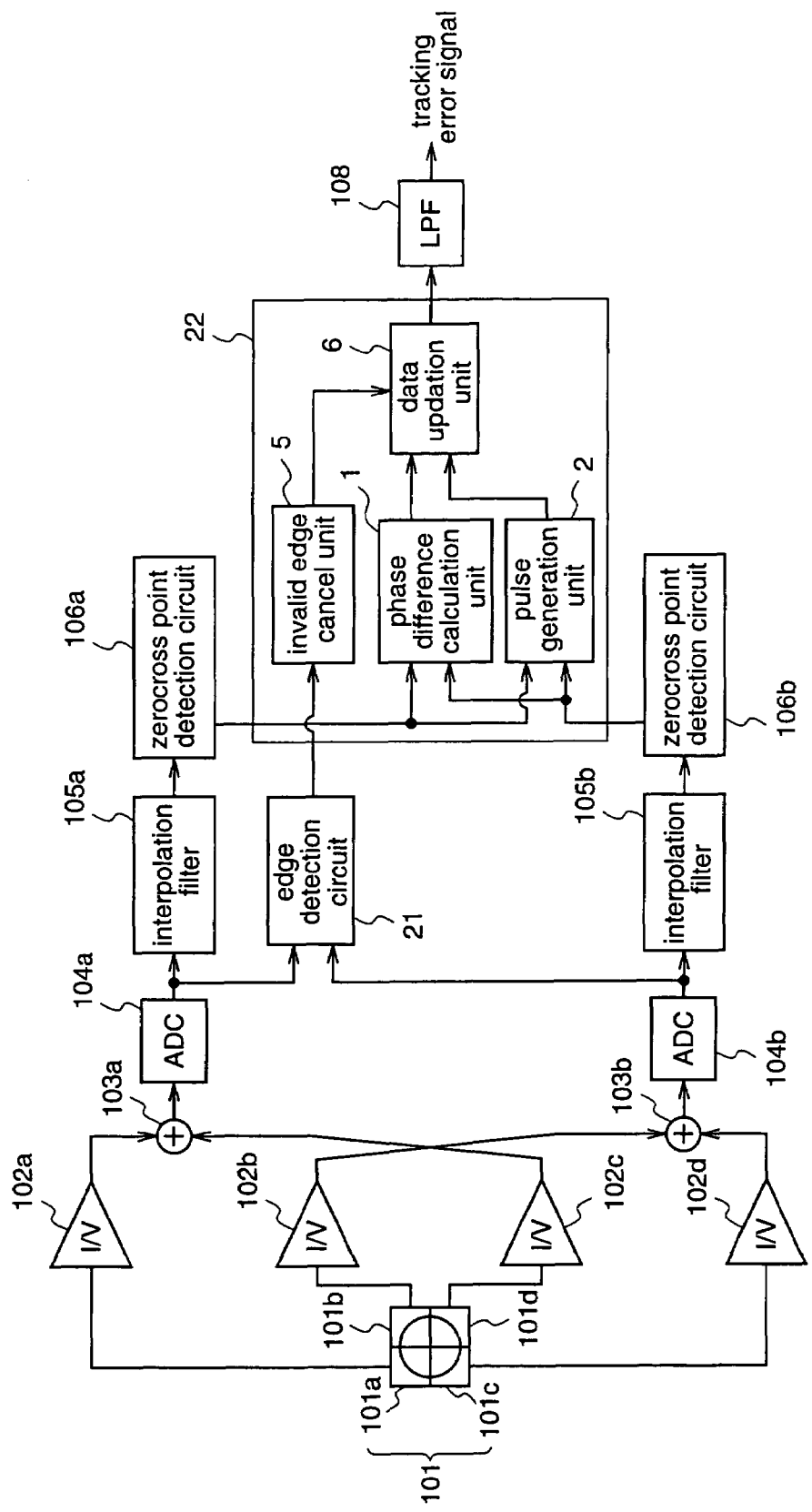
FIG. 4 is a block diagram illustrating a tracking error detection apparatus according to a second embodiment of the present invention.

FIG. 4 is a block diagram illustrating an example of a tracking error detection apparatus according to the second embodiment.

In FIG. 4, the tracking error detection apparatus comprises a photodetector 101, current-to-voltage converters 102a to 102d, first and second adders 103a and 103b, first and second analog-to-digital converters (ADC) 104a and 104b, an edge detection circuit 21, first and second interpolation filters 105a and 105b, first and second zerocross point detection circuits 106a and 106b, a phase difference detection circuit 22, and a low-pass filter (LPF) 108. Since the constituents of the tracking error detection apparatus according to the second embodiment other than the edge detection circuit 21 and the phase difference detection circuit 22 are identical to those of the conventional tracking error detection apparatus described with reference to FIG. 10, repeated description is not necessary.

The edge detection circuit 21 detects the states of edges to be used for phase comparison, using binary signals of sampling data of digital signals outputted from the first and second ADCs 104a and 104b. To be specific, the edge detection circuit 21 detects, from an edge position of a signal including a preceding edge, the state of another signal, at each point where a phase difference is to be detected. Then, the edge detection circuit 21 outputs a signal indicating that the edges are aligned with each other, or a signal indicating that the signal level of the other signal is "1" or "0", according to the result of detection.

The phase difference detection circuit 22 comprises a phase difference calculation unit 1, a pulse generation unit 2, an invalid edge cancel unit 5, and a data updation unit 6. Since the phase difference calculation unit 1 and the pulse generation unit 2 are identical to those of the conventional phase difference detection circuit 107 described with reference to FIG. 10, repeated description is not necessary.

The invalid edge cancel unit 5 judges whether the edges to be the targets of phase comparison are valid as edges for phase comparison or not, on the basis of the output from the edge detection circuit 21. When the edges are judged as "invalid", the data updation unit 6 does not perform output/updation of the phase comparison result at the invalid edges.

The data updation unit 6 operates at every phase comparison end pulse outputted from the pulse generation unit 2, updates the output data using the phase comparison result outputted from the phase difference calculation unit 1, when the result of judgement by the invalid edge cancel unit 5 is "valid", and maintains the output level of the output data until the next phase comparison end pulse arrives. On the other hand, when the result of judgement by the invalid edge cancel unit 5 is "invalid", the data updation unit 6 does not update the output data using the phase comparison result outputted from the phase difference calculation unit 1, and maintains the output level of the data that has been outputted at the just-previous phase comparison end pulse.

Next, the judgement as to whether the edges to be used for phase comparison are valid or not, which is performed by the invalid edge cancel unit 5, will be described in more detail. It is assumed that the optical disc to be played is a DVD-ROM.

Figure 5A:
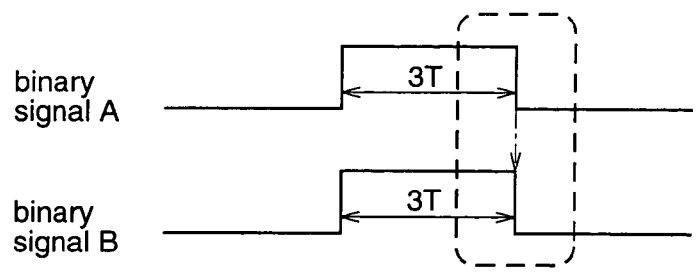
FIGS. 5(a)-5(c) are diagrams illustrating the relationship of edges that are detected at a point where a phase difference is detected, when playing a DVD-ROM.
Figure 5B:
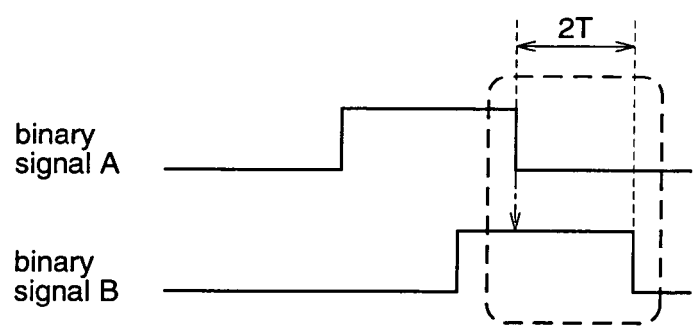
Figure 5C:
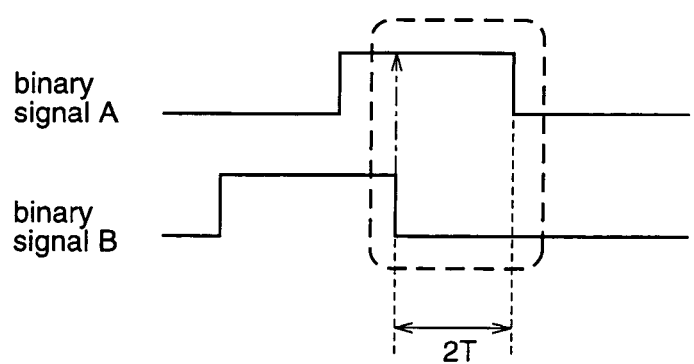

FIGS. 5(*a*)-5(*c*) illustrate the relationship of edges detected at a point where a phase difference is to be detected, when playing a DVD-ROM. To be specific, FIG. 5(*a*) shows a case where the phase difference is 0, FIG. 5(*b*) shows a case where phase advance is maximum, and FIG. 5(*c*) shows a case where phase delay is maximum.

The relationship between the pits and the tracking error signal on the DVD-ROM is that the maximum value of tracking error converted from the track pitch is about 2T while the pit length of the recording pattern is 3T at minimum, as already described with reference to FIGS. 3(*a*) and 3(*b*). Therefore, when detecting, from an edge falling position of a signal including a preceding edge, the state of the other signal, between the edges used for detecting a phase difference of the two signals to be subjected to phase comparison, the detected state should be either that the edges are aligned with each other (FIG. 5(*a*)) or that the signal level of the other signal is "1" (FIG. 5(*b*) or 5(*c*)). Therefore, when the signal level of the other signal is "0", it is judged that the edges are incorrectly detected. The same can be said of other media such as a CD-R and a CD-ROM.

Accordingly, the invalid edge cancel unit 5 judges that the edges to be used for phase comparison are valid edges when the signal outputted from the edge detection circuit 21 indicates that the edges are aligned with each other or that the signal level of the other signal level is "1", and judges that the edges are invalid edges when the signal level of the other signal is "0".

Next, the operation of the phase difference detection circuit 22 will be described.

FIG. 6 is a diagram for explaining the operation of the invalid edge cancel unit 5 of the tracking error detection apparatus according to the second embodiment. FIG. 6 shows, from top to bottom, a first signal sequence outputted from the first zerocross point detection circuit 106*a* (phase comparison input A), a second signal sequence outputted from the second zerocross point detection circuit 106*b* (phase comparison input B), a binary signal of the first signal sequence, which is used for judgement in the invalid edge cancel unit 5 (binary signal A), a binary signal of the second signal sequence, which is used for judgement in the invalid edge cancel unit 5 (binary signal B), a phase comparison end pulse outputted from the pulse generation unit 2, and a phase comparison output from the phase difference detection circuit 11.

The two sequences of signals outputted from the first and second zerocross point detection circuits 106*a* and 106*b* (the phase comparison inputs A and B shown in FIG. 6) are input to the phase difference calculation unit 1 and to the pulse generation unit 2 of the phase difference detection circuit 11. In the phase difference calculation unit 1, phase differences $\Delta 1$, $\Delta 2$, and $\Delta 3$ are successively calculated on the basis of the zerocross information detected by the zerocross point detection circuits 106*a* and 106*b*. On the other hand, in the pulse generation unit 2, pulse signals each corresponding to one sampling clock are generated at positions where the respective data sequences to be used for phase comparison perform zerocross, and a pulse signal that appears later at a point where phase comparison is carried out, between the generated pulse signals corresponding to the respective data sequences, is output as a phase comparison end pulse (refer to the phase comparison end pulse shown in FIG. 6).

At this time, the invalid edge cancel unit 5 judges whether the edges to be the targets of phase comparison are valid as edges for phase comparison or not, on the basis of the output from the edge detection circuit 21 (refer to the binary signals A and B shown in FIG. 6), and outputs a result of judgement to the data updation unit 6.

In the data updation unit 6, when the result of judgement by the invalid edge cancel unit 5 is "valid", updation of the output data using the phase comparison result outputted from the phase difference calculation unit 1 is carried out at every phase comparison end pulse outputted from the pulse generation unit 2, and the output data is maintained until the next phase comparison end pulse arrives. On the other hand, when the result of judgement is "invalid", updation of the output data using the phase comparison result is not carried out, and the output level of the data that has been outputted at the just-previous phase comparison end pulse is maintained. Thereby, the phase difference $\Delta 2$ obtained between the phase comparison inputs A and B shown in FIG. 6 is not updated in the data updation unit 6, and the phase differences $\Delta 1$ and $\Delta 3$ are output from the data updation unit 6 as phase comparison results (refer to the phase comparison output shown in FIG. 6).

Therefore, the data updation unit 6 maintains the value of the just-previous phase comparison result in the position that is judged as invalid edges by the invalid edge cancel unit 5, thereby avoiding influences of false detection during phase error detection.

As described above, according to the tracking error detection apparatus of the second embodiment, the invalid edge cancel unit 5 of the phase difference detection circuit 22 judges whether the edges to be the targets of phase comparison are valid as edges for phase comparison or not, and the data updation unit 6 does not perform phase comparison at the edges that are judged as "invalid". Thereby, influences of false detection during phase error detection can be reduced, thereby improving accuracy of the tracking error signal.

In this second embodiment, the edge detection circuit 21 detects, from an edge falling position of a signal including a preceding edge, the state of another signal, at each point where a phase difference is to be detected. Then, the invalid edge cancel unit 5 judges the edge as a valid edge when the edge is aligned with the edge of the other signal or when the level of the other signal is "1", while judges the edge as an invalid edge when the level of the other signal is "0". However, the edge detection circuit 21 and the invalid edge cancel unit 5 are not restricted to those mentioned above so long as the invalid edge cancel unit 5 judges "valid" or "invalid" for an edge to be used for phase comparison, on the basis of the state of the edge that is detected by the edge detection circuit 21. For example, the edge detection circuit 21 may detect the rising edges or falling edges of binary signals of sampling data of two digital signals, and detect a signal indicating whether or not a distance between the rising edges or a distance between the falling edges is equal to or smaller than a second predetermined value (e.g., 2T), and then the invalid edge cancel unit 5 may judge the edges as valid edges when the distance between the rising edges or falling edges is equal to or smaller than the second predetermined value, and judge the edges as invalid edges when the distance between the rising edges or falling edges is larger than the second predetermined value.

Further, in the first and second embodiments of the invention, after generating two sequences of analog signals by the first and second adders as signal generators for generating two signal sequences, the first and second ADCs 104a and 104b generate two sequences of digital signals. However, the method of generating two sequences of digital signals to be input to the phase difference detection circuit 107 is not restricted thereto. For example, two sequences of digital signals may be generated after converting the analog signals corresponding to the respective photoreceptor elements of the photodetector 101 into digital signals by the ADC 104.

Embodiment 3

Hereinafter, a tracking error detection apparatus according to a third embodiment of the present invention will be described.

Figure 7:
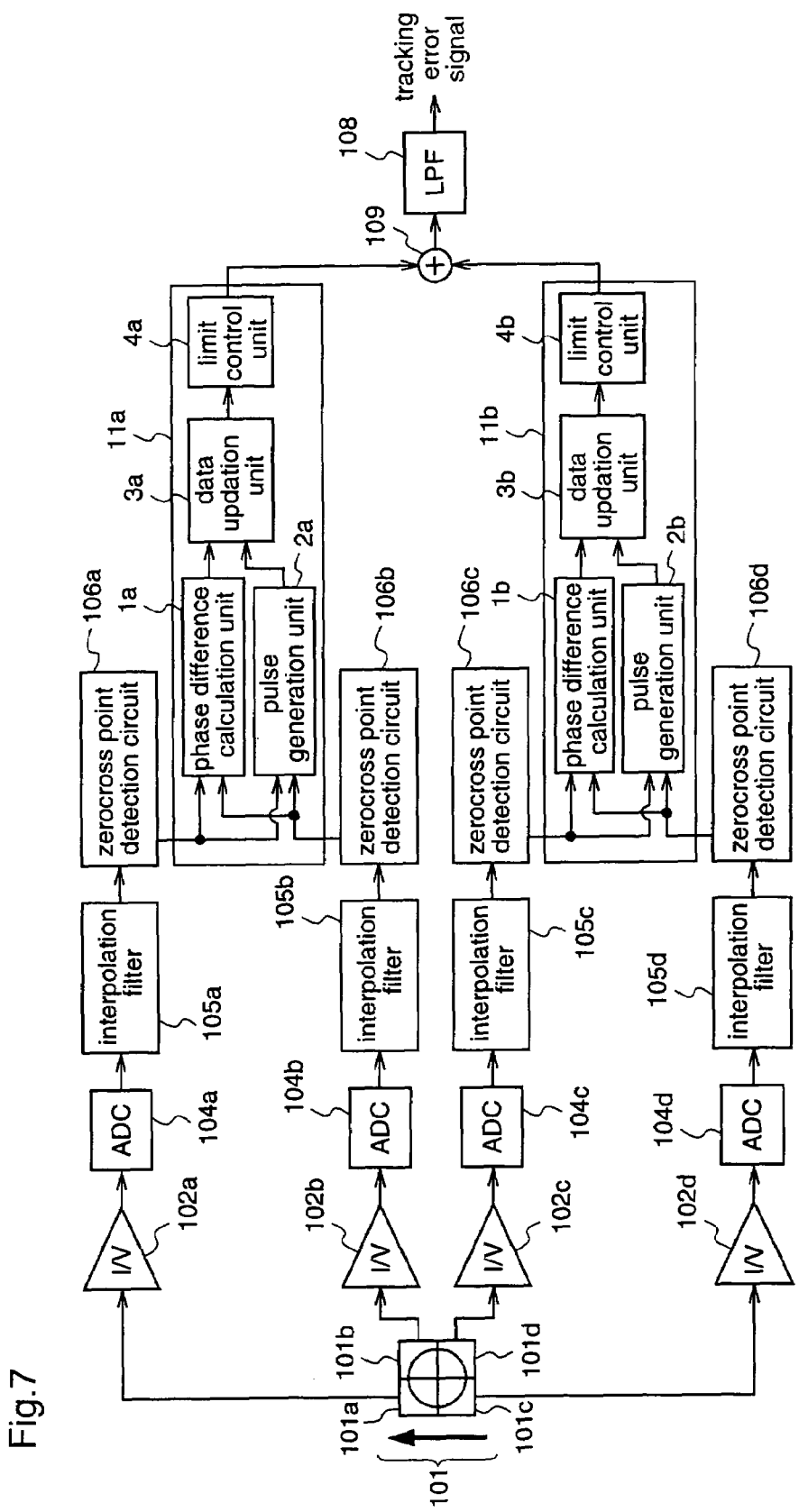
FIG. 7 is a block diagram illustrating a tracking error detection apparatus according to a third embodiment of the present invention.

FIG. 7 is a block diagram illustrating an example of a tracking error detection apparatus according to the third embodiment.

In FIG. 7, the tracking error detection apparatus comprises a photodetector 101 that has photoreceptor elements 101a, 101b, 101c, and 101d each receiving a reflected light beam from a light spot, and outputs photo currents according to the amounts of light received by the respective photoreceptor elements; first to fourth current-to-voltage converter 102a to 102d for converting the photo currents outputted from the photodetector 101 into voltage signals; first to fourth analog-to-digital converters (ADCs) 104a to 104d for obtaining first to fourth digital signal sequences from the voltage signals obtained by the first to fourth current-to-voltage converters 102a to 102d; first to fourth interpolation filters 105a to 105d for subjecting the inputted digital signals to interpolation; first to fourth zerocross point detection circuits 106a to 106d for detecting zerocross points of the first to fourth digital signal sequences interpolated by the first to fourth interpolation filters 105a to 105d; first and second phase difference detection circuits 11a and 11b for performing phase comparison using a distance between the zerocross points of predetermined two sequences of digital signals among the zerocross points of the four sequences of digital signals, and imposing a limitation on a phase comparison result if the phase comparison result is larger than the first predetermined value that is previously set when outputting the phase comparison result; an adder 109 for adding the output signal from the first phase difference detection circuit 11a and the output signal from the second phase difference detection circuit 11b; and a low-pass filter (LPF) 108 for subjecting the output signal from the adder 109 to band restriction to obtain a tracking error signal. In this third embodiment, the photodetector 101 comprises the four photoreceptor elements 101a, 101b, 101c, and 101d that are partitioned in the tangential direction and perpendicular direction with respect to an information track that is recorded as an information pit line on the recording medium. The direction, along which the information track mapped on the photodetector 101 extends, is shown by an arrow in FIG. 7. Further, a zerocross point is a point where an inputted digital signal intersects a center level of the digital signal that is calculated from an average value or the like of the digital signal.

Next, the first and second phase difference detection circuits 11a and 11b will be described in more detail.

The first phase difference detection circuit 11a performs phase comparison using the distance between the zerocross points of the two sequences of digital signals which are obtained from the photoreceptors positioned forward in the information track advancing direction, i.e., the zerocross points outputted from the zerocross point detection circuits 106a and 106b, among the zerocross points of the four sequences of digital signals, and limits the result of phase comparison to a value under the first predetermined value when the phase comparison result is larger than the first predetermined value when outputting the phase comparison result. The first phase difference detection circuit 11a comprises the phase difference calculation unit 1a, the pulse generation unit 2a, the data updation unit 3a, and the limit control unit 4a.

The second phase difference detection circuit 11b performs phase comparison using the distance between the zerocross points of the two sequences of digital signals which are obtained from the photoreceptors positioned backward in the information track advancing direction, i.e., the zerocross points outputted from the zerocross point detection circuits 106c and 106d, among the zerocross points of the four sequences of digital signals, and limits the result of phase comparison to a value under the first predetermined value when the phase comparison result is larger than the first predetermined value when outputting the phase comparison result. The second phase difference detection circuit 11b comprises the phase difference calculation unit 1b, the pulse generation unit 2b, the data updation unit 3b, and the limit control unit 4b.

The phase difference calculation units 1a and 1b, the pulse generation units 2a and 2b, the data updation units 3a and 3b, and the limit control units 4a and 4b correspond to the phase difference calculation unit 1, the pulse generation unit 2, the data updation unit 3, and the limit control unit 4 which are described for the first embodiment with reference to FIG. 1, and therefore, repeated description is not necessary.

Next, detection of a tracking error signal using the phase difference method will be described with reference to FIG. 8.

It is known that an offset occurs depending on the pit depth during detection of a tracking error signal using the phase difference method.

Figure 8A:
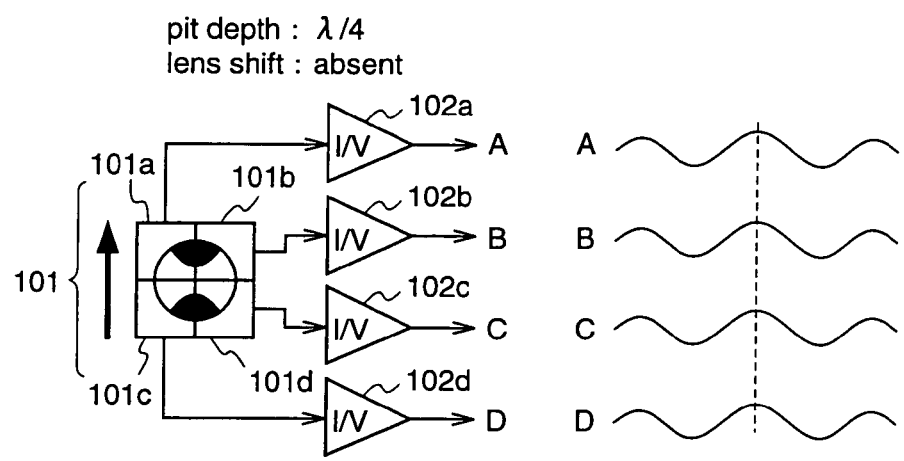
FIGS. 8(a)-8(d) are diagrams illustrating the principle of occurrence of an offset that occurs in a tracking error signal depending on pit depth.
Figure 8B:
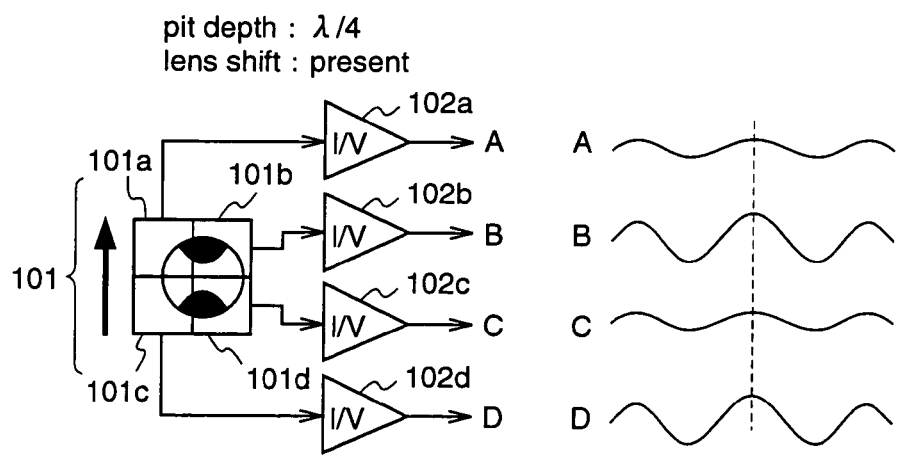
Figure 8C:
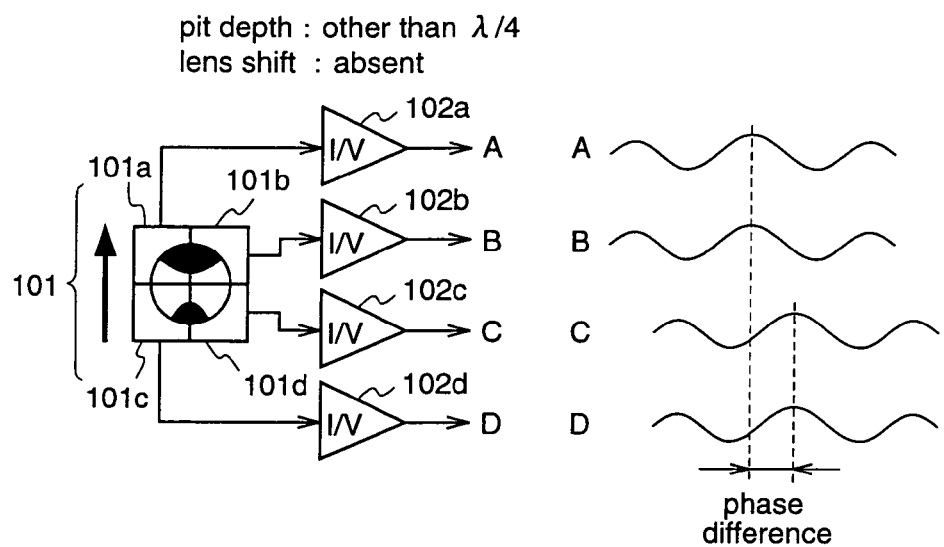
Figure 8D:
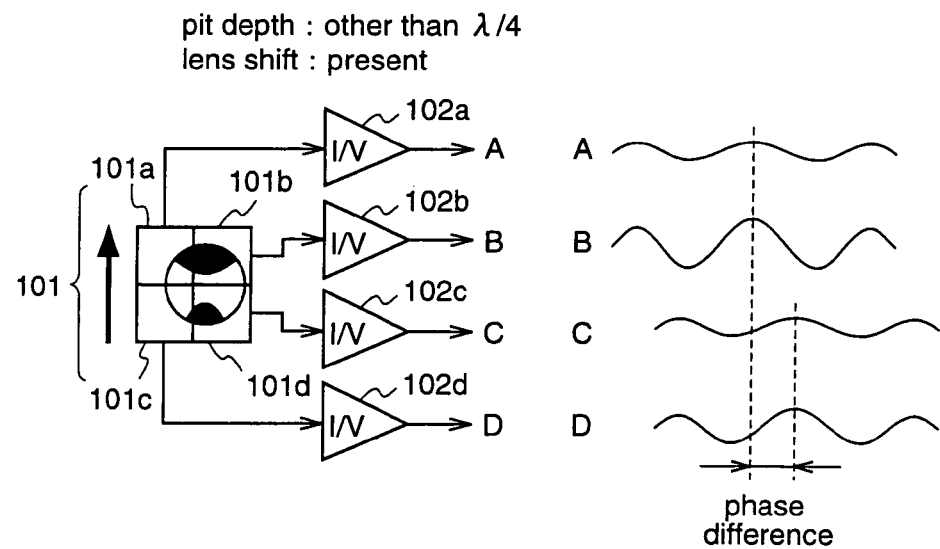

FIGS. 8(a)-8(d) are diagrams for explaining the principle of occurrence of an offset in the tracking error signal, which depends on the pit depth. To be specific, FIG. 8(a) shows the outputs of the first to fourth current-to-voltage converters 102a to 102d in the case where the pit depth is $\lambda/4$ and there is no lens shift, FIG. 8(b) shows the outputs of the first to fourth current-to-voltage converters 102a to 102d in the case where the pit depth is $\lambda/4$ and there is a lens shift, FIG. 8(c) shows the outputs of the first to fourth current-to-voltage converters 102a to 102d in the case where the pit depth is other than $\lambda/4$ and there is no lens shift, and FIG. 8(d) shows the outputs of the first to fourth current-to-voltage converters 102a to 102d in the case where the pit depth is other than $\lambda/4$ and there is a lens shift.

The photodetector 101 comprises the first to fourth photoreceptor elements 101a, 101b, 101c, and 101d. The direction, along which the information track mapped on the photodetector 101 extends, is shown by an arrow.

As shown in FIGS. 8(a) and 8(b), when the pit depth is λ/4 (λ is the wavelength of the light beam), no phase difference occurs in the outputs of the first to fourth current-to-voltage converters 102a to 102d, and the waveform pattern that appears in a (A+C) signal is identical to the waveform pattern that appears in a (B+D) signal, each signal being obtained by adding the outputs of the diagonally placed photoreceptor elements of the photodetector 101. Therefore, even when a lens shift occurs as shown in FIG. 8(b) to move the light spot on the photodetector, a phase difference that occurs between the (A+C) signal and the (B+D) signal is zero so long as the light spot is on the center of the track.

On the other hand, when the pit depth is not λ/4, a phase difference that varies according to the focusing state occurs as shown in FIGS. 8(c) and 8(d). When the light spot on the photodetector is not moved as shown in FIG. 8(c), the signal amplitudes of the A~D signals are not varied and, therefore, the waveform patterns that appear in the (A+C) signal and the (B+D) signal are not affected by the phase difference that varies according to the focusing state, and the tracking error signal becomes zero. However, as shown in FIG. 8(d), when the light spot on the photodetector is moved due to a lens shift, the signal amplitudes of the A~D signals are varied and, therefore, the waveform patterns that appear in the (A+C) signal and the (B+D) signal are affected by the phase difference that varies according to the focusing state, resulting in an offset in the tracking error signal.

Therefore, in the tracking error detection apparatuses according to the first and second embodiments, when the depth of the pit carved in the disc is different from λ/4, an additional control circuit for canceling the above-mentioned offset is required in order to correctly detect a tracking error signal.

So, in the tracking error detection apparatus according to the third embodiment, a tracking error signal is detected using a phase difference between two photoreceptor elements positioned forward or backward with respect to the information track advancing direction, taking notice that no phase difference occurs between the two photoreceptor elements positioned forward or backward in the information track advancing direction, i.e., the photoreceptor elements 101a and 101b or the photoreceptor elements 101c and 101d.

To be specific, as shown in FIG. 7, a phase difference between the photoreceptor elements 101a and 101b is detected by the first phase difference detection circuit 11a while a phase difference between the photoreceptor elements 101c and 101d is detected by the second phase difference detection circuit 11b, and the output signal of the first phase difference detection circuit 11a and the output signal of the second phase difference detection circuit 11b are added by the adder 109, and thereafter, the signal outputted from the adder 109 is subjected to band restriction by the LPF 108, thereby to obtain a tracking error signal.

When the tracking error signal is thus generated, as is evident from FIGS. 8(a)~8(d), a phase difference between the photoreceptor elements placed forward and backward with respect to the information track advancing direction, i.e., a phase difference in the output signals between the photoreceptor element 101a (101b) and the photoreceptor element 101c (101d), does not adversely affect the tracking error signal. Therefore, even when the objective lens is displaced due to tracking control and thereby the light spot is displaced on the photodetector 101, variations in the offset during tracking error detection can be suppressed.

As described above, in the tracking error detection apparatus according to the third embodiment, the signal amplitude during phase error detection is limited to reduce influences of false detection, thereby improving accuracy of the tracking error signal. Further, no offset that depends on the depth of the pit carved in the disc occurs, thereby producing an accurate tracking error signal.

Embodiment 4

Next, a tracking error detection apparatus according to a fourth embodiment of the present invention will be described.

Figure 9:
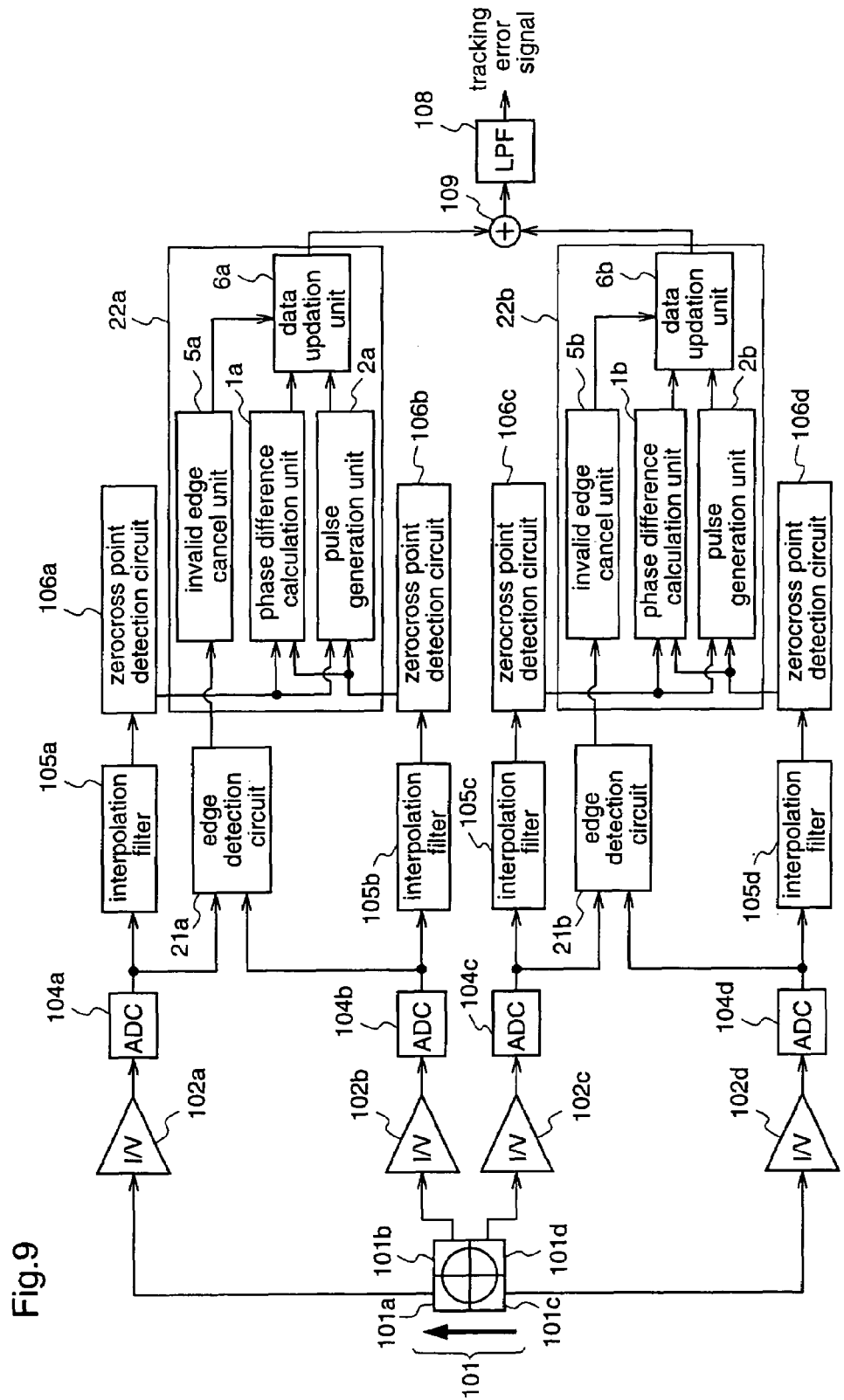
FIG. 9 is a block diagram illustrating a tracking error detection apparatus according to a fourth embodiment of the present invention.

FIG. 9 is a block diagram illustrating an example of a tracking error detection apparatus according to the fourth embodiment.

In the tracking error detection apparatus according to the fourth embodiment, the edge detection circuit 21 and the phase difference detection circuit 22 which are included in the tracking error detection apparatus according to the second embodiment shown in FIG. 4 are provided for the two sequences of digital signals obtained from the photoreceptor elements positioned forward in the information track advancing direction, and for the two sequences of digital signals obtained from the photoreceptor elements positioned backward in the information track advancing direction, respectively.

Also in this case, since no phase comparison is carried out at an invalid edge, influences of false detection during phase error detection are reduced, resulting in improved accuracy of the tracking error signal. Further, no offset that depends on the depth of the pit carved in the disc occurs, thereby producing an accurate tracking error signal.

A tracking error detection apparatus according to the present invention can reduce influences of false detection during phase error detection, and improve accuracy of a tracking error signal. Therefore, it is useful as a technique for performing accurate tracking control.

What is claimed is:

1. A tracking error detection apparatus comprising:
a photodetector comprising four photoreceptor elements which are partitioned along a tangential direction and a perpendicular direction with respect to an information track that is recorded as an information pit line on an optical disc to be played;
zerocross detection circuits for detecting zerocross points at which two digital signals intersect center levels of the respective digital signals, each of said two digital signals being obtained by adding output signals from the two photoreceptor elements positioned on a diagonal line, among four signals that are generated according to the amounts of light received by the respective photoreceptor elements and are outputted from the photodetector;
a phase difference detection circuit for performing phase comparison based on a distance between the zerocross points of the two digital signals, and limiting a result of phase comparison to a value under a first predetermined value when the result of phase comparison is larger than the first predetermined value; and
a low-pass filter for performing band restriction to a signal outputted from the phase difference detection circuit to obtain a tracking error signal, wherein,
the first predetermined value is a maximum value of the tracking error signal, the maximum value being based on a relationship between a shortest pit length and a track pitch of the optical disc to be played.

2. A tracking error detection apparatus as defined in claim 1 wherein said phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, respectively, and outputting a phase comparison end pulse based on the generated pulse signals;

a data updation unit for updating output data based on the result of phase comparison successively outputted from the phase difference calculation unit, at every phase comparison end pulse outputted from the pulse generation unit, and maintaining an output level of the output data until the next phase comparison end pulse occurs; and a limit control unit for judging whether the output level of the output data from the data updation unit is larger than the first predetermined value or not, limiting the output level of the output data to a value under the first predetermined value when the output level of the output data from the data updation unit is larger than the first predetermined value, and outputting the output data.

3. A tracking error detection apparatus comprising:

a photodetector comprising four photoreceptor elements which are partitioned along a tangential direction and a perpendicular direction with respect to an information track that is recorded as an information pit line on an optical disc to be played;

zerocross detection circuits for detecting zerocross points at which four digital signals intersect center levels of the respective digital signals, said four digital signals being generated according to the amounts of light received by the respective photoreceptor elements and are outputted from the photodetector;

a first phase difference detection circuit for performing phase comparison based on a distance between the zerocross points of two digital signals obtained from the photoreceptor elements positioned forward in the advancing direction of the information track, among the four digital signals, and limiting a result of phase comparison to a value under the first predetermined value when the result of phase comparison is larger than the first predetermined value; and a second phase difference detection circuit for performing phase comparison based on a distance between the zerocross points of two digital signals obtained from the photoreceptor elements positioned backward in the advancing direction of the information track, among the four digital signals, and limiting a result of phase comparison to a value under the first predetermined value when the result of phase comparison is larger than the first predetermined value;

an addition circuit for adding the output signals of the first and second phase difference detection circuits; and a low-pass filter for performing band restriction to the signal outputted from the addition circuit to obtain a tracking error signal, wherein the first predetermined value is a maximum value of the tracking error signal, the maximum value being based on a relationship between a shortest pit length and a track pitch of the optical disc to be played.

4. A tracking error detection apparatus as defined in claim 3 wherein each of said first and second phase difference circuits comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, respectively, and outputting a phase comparison end pulse based on the generated pulse signals;

a data updation unit for updating output data based on the result of phase comparison successively outputted from the phase difference calculation unit, at every phase comparison end pulse outputted from the pulse generation unit, and maintaining an output level of the output data until the next phase comparison end pulse occurs; and a limit control unit for judging whether the output level of the output data from the data updation unit is larger than the first predetermined value or not, limiting the output level of the output data to a value under the first predetermined value when the output level of the output data from the data updation unit is larger than the first predetermined value, and outputting the output data.

* * * * *